Figure 4:
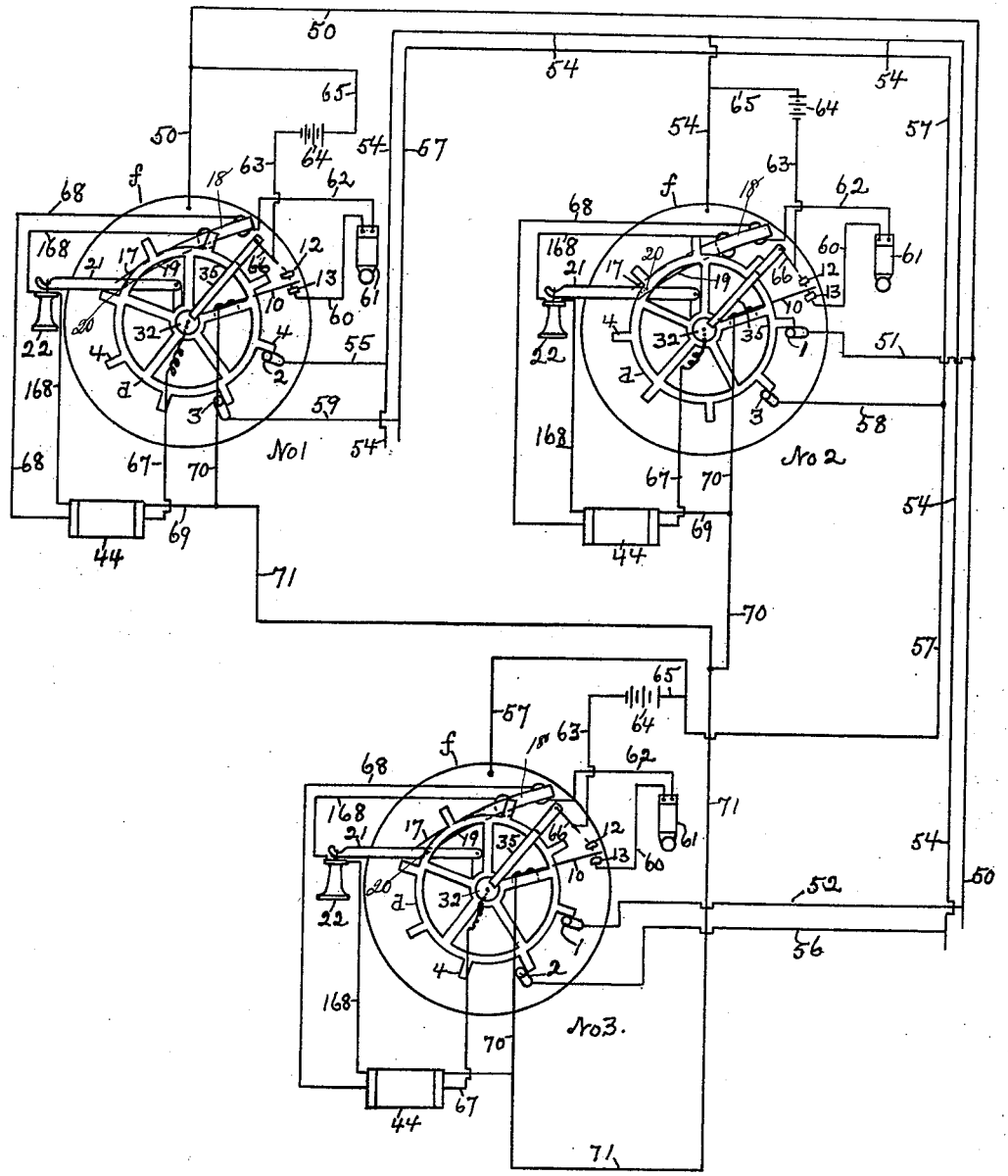

No. 642,934. Patented Feb. 6, 1900.
F. A. SWAN.
TELEPHONIC INSTRUMENT.
(Application filed May 3, 1899.)
(No Model.) 2 Sheets—Sheet 1.
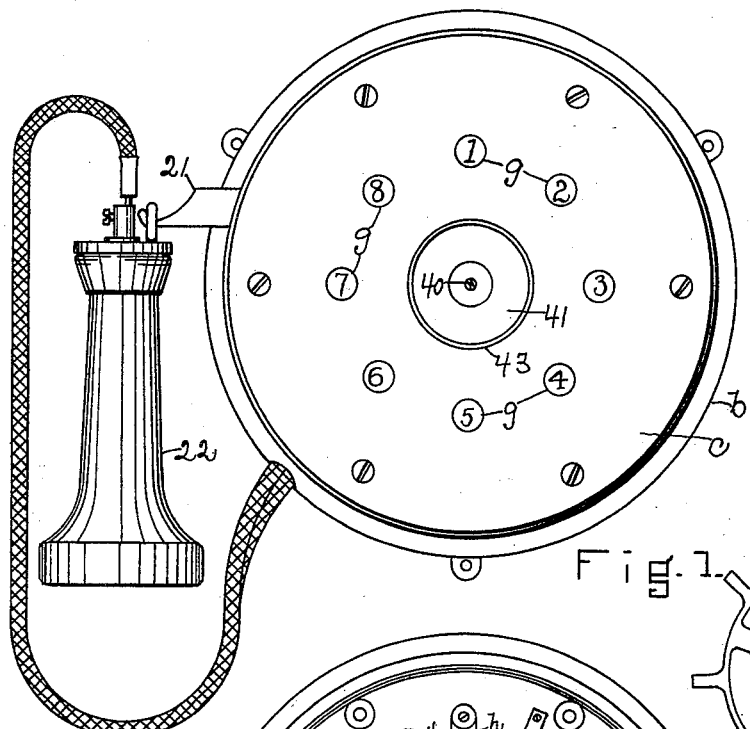
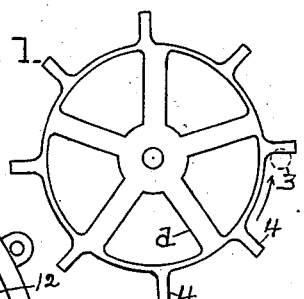
Fig. 1.
Fig. 5.
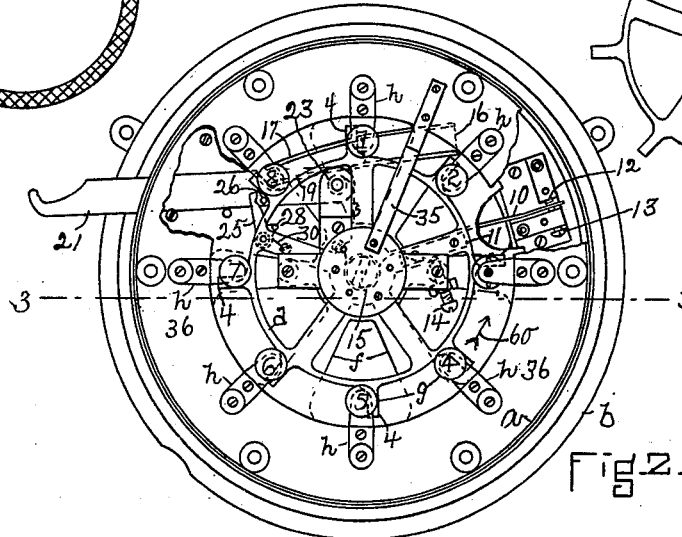
Fig. 2.
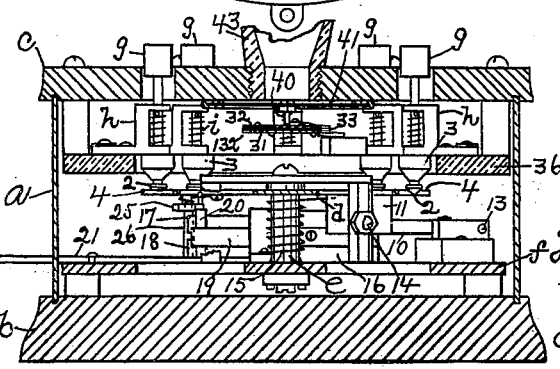
Fig. 3.
WITNESSES.
Matthew M. Blunt
J. Murphy
INVENTOR.
Frederick A. Swan
by Jas. F. Churchill
ATT'Y.
THE NORRIS PETERS CO., PHOTO-LITHO., WASHINGTON, D. C.

UNITED STATES PATENT OFFICE.

FREDERICK A. SWAN, OF BOSTON, MASSACHUSETTS.

TELEPHONIC INSTRUMENT.

SPECIFICATION forming part of Letters Patent No. 642,934, dated February 6, 1900.

Application filed May 3, 1899. Serial No. 715,424. (No model.)

*To all whom it may concern:*

Be it known that I, FREDERICK A. SWAN, a citizen of the United States, residing in Boston, in the county of Suffolk and State of Massachusetts, have invented an Improvement in Telephonic Instruments, of which the following description, in connection with the accompanying drawings, is a specification, like letters and figures on the drawings representing like parts.

This invention relates to a telephonic instrument for use in intercommunicating systems, and has for its object to provide a simple and efficient instrument for the purpose specified.

In accordance with this invention the instrument is provided with a casing having a cover through which project a series of push-rods or circuit-controllers, one for each station or instrument included in the system. The push-rods coöperate with a rotatable wheel, disk, or ring mounted to oscillate within the casing and controlling the circuits of the system, as will be described. The oscillating disk or wheel is adapted to be moved in one direction by the push-rods when the latter are pushed or forced into the casing, and the said rods are locked by said ring, as will be described, until released by the movement of the ring, which may be effected by one of the push-rods or by the hook or lever supporting the receiver. The inclosing case contains within it a transmitter supported as will be described and coöperating with a stud or post affixed to a diaphragm attached to the cover of said casing, as will be described. These and other features of this invention will be pointed out in the claims at the end of this specification.

Figure 1 is an elevation of a telephonic instrument embodying this invention; Fig. 2, a similar view with the cover removed and parts broken away; Fig. 3, a section on the line 3 3, Fig. 2; Fig. 4, a diagram of circuits to be referred to, and Fig. 5 a detail to be referred to.

The instrument herein shown as embodying this invention is provided with an inclosing casing $a$, provided with a bottom $b$ and cover or top $c$. The casing $a$ contains within it an oscillating ring, disk, or wheel $d$, of metal, and loosely mounted on a stud $e$, secured to a metal frame $f$. The wheel, disk, or ring $d$ is moved in one direction by each of a series of push-rods or circuit-controllers $g$, herein shown as eight in number and arranged in a circle. (See Fig. 1.) Each circuit-controller or push-rod $g$ is provided at its inner end with a head made, as shown, in the form of two cones 2 3, the cone 3 being larger than the cone 2, and the said conical head coöperates with the wheel $d$ to turn it, which may be effected by the conical heads engaging pins or radial projections 4 extended from the circumference of the wheel. (See Figs. 2 and 5.)

The push-rods $g$ are supported by terminal uprights $h$, secured to an insulating ring or disk 36, and a line-wire is connected to each of said uprights. Each push-rod, as herein shown, is encircled by a spiral spring $i$, which serves to restore the push-rod to its normal position when released from the wheel or disk $d$, which latter forms a circuit-terminal common to all the push-rods, as will be described.

When a push-rod is forced into the casing far enough to bring the larger cone 3 into contact with a pin 4, movement of the disk or wheel $d$ is thereby effected, and the cones 2 3 are separated a sufficient distance to permit a partial return movement of the wheel or disk when the pressure is removed from the push-rod, so as to bring the pin above the top or upper surface of the lower or smaller cone 2, and thus lock the push-rod in engagement with the wheel until positively released, as will be described. The engagement of the push-rod with the wheel or disk $d$ connects the two parts in circuit, as will be described.

The wheel or disk $d$ operates a circuit-controlling member or contact-arm 10, represented as a piece of spring metal attached at one end to a block 11 of insulating material secured to the said ring or disk. The member 10 extends between and coöperates with two circuit-terminals 12 13, suitably insulated from the metal frame of the instrument, and the said member normally makes contact with the terminal 13, as shown in Fig. 2. The member 10 is properly positioned with relation to the terminals 12 13 by a set-screw 14, coöperating with the insulating-block 11 and also acting as a back-stop to limit the return movement of the wheel or disk $d$ by its spring 15.

The metal frame $f$ of the instrument has secured to it a block 16 of insulating material, having fastened to one face two terminal springs or arms 17 18 and to its opposite face a terminal spring or arm 19, and between these sets of terminal arms or springs projects a pin or stud 20 on the hook or lever 21, which supports the receiver 22. In the normal position of the hook—that is, with the receiver hung thereon—the pin 20 makes contact with the terminal spring 19, and when the receiver is removed the hook is elevated by a spring 23, (shown by dotted lines, Fig. 2,) and the pin 20 is disengaged from the terminal 19 and engaged with the two terminals 17 18.

The lever 21 is designed to rotate the wheel or disk $d$ when the receiver is hung thereon, so as to disengage the said disk or wheel from the upper surface of the cone 2 of a depressed push-rod, and thereby permit the spring $i$ to restore said push-rod into its normal position. This result may be effected, as herein shown, by means of a dog 25, pivotally attached to the wheel $d$ and coöperating with a stud or pin 26, projecting from the side of the lever 21. The dog 25, as shown, is provided with a pin or projection 28, which is normally held against an arm or spoke of the wheel $d$ by a spring 30. On the upward movement of the lever 21 the pin 26 strikes against the dog 25 and turns the latter on its pivot against the action of the spring 30 until the pin is lifted clear of the said dog, whereupon the spring 30 restores the said dog to its normal position with its projection 28 in engagement with the spoke of the wheel, in which position the dog is in line with the pin 26, so that when the lever 21 is lowered by the receiver the pin 26 will engage the dog 25 and turn the disk or ring $d$ in the direction indicated by arrow 60, Fig. 2, until the pin slips off of the dog 25, and at such time the disk or ring $d$ will have been moved sufficiently to disengage it from the cone 2 of the depressed push-rod, and thus permit the latter to be restored to its normal position by its spring $i$.

The casing contains within it a microphone-transmitter, preferably of the construction herein shown and consisting of a holder for granulated or comminuted carbon, (represented by the heavy black line 31 in Fig. 3,) the said holder consisting of two metal disks 32 132, separated at their circumference by a washer 33, of insulating material, to form a chamber in which the carbon 31 is placed. The disks 32 and 132 are suitably fastened to the washer 33 and electrically disconnected, and the completed holder is yieldingly supported by a sheet-metal spring 35, fastened to the ring 36, of insulating material. The carbon-holder has coöperating with it a projection or point 40, secured to a substantially rigid disk or diaphragm 41, attached to the cover $c$ in line with the mouthpiece 43 and acting to agitate the particles of carbon and prevent packing of the same. The casing $a$ is also designed to contain an induction-coil 44. (Clearly shown in the diagram, Fig. 4.)

The operation of the system of intercommunication will be more readily understood by reference to the diagram Fig. 4, in which three instruments are shown as included in the system; but it will be understood that any desired number of instruments within limits may be included in said system. In Fig. 1 I have represented the instrument as provided with eight circuit-controllers or push-rods; but it is evident that this number may be largely increased by increasing the diameter of the wheel $d$ and providing additional pins 4 and coöperating push-rods.

In practice the metal frame $f$ of each instrument is grounded or has connected to it the line-wire corresponding in number to said instrument. In the diagram Fig. 4 three instruments are shown and marked Nos. 1, 2, and 3. No. 1 instrument has connected to its metal frame $f$ a line-wire 50, which extends to the other instruments in the circuit and is connected to the No. 1 push button or rod of instruments Nos. 2 and 3, respectively, by wires 51 52. The No. 2 instrument has its metal frame $f$ connected to line-wire 54, which extends to the other instruments and is connected to the push-rod 2 of instrument No. 1 by branch wire 55 and to the push-rod 2 of instrument No. 3 by branch wire 56. The No. 3 instrument has its metal frame $f$ connected to line-wire 57, which extends to the other instruments and is connected by wire 58 to push-rod 3 of No. 2 instrument and by wire 59 to push-rod 3 of No. 1 instrument. The remaining circuit connections of all the instruments are the same, and I will specifically describe the same with relation to one—namely, instrument No. 1.

The contact-terminal 13 has connected to it one wire 60 of the call-bell 61, having its other wire 62 connected to the terminal spring 19. The contact-terminal 12 is connected by wire 63 with one pole of a battery 64, having its other pole connected by wire 65 to the line-wire 50. The battery-wire 63 is connected by branch wire 66 with the spring 35, connected with the front disk 32, and the back disk 132 has connected to it one end 67 of the primary coil of the induction-coil 44, the other end 68 of which is connected to spring 17. The spring 18 has connected to it one end 168 of the secondary of the induction-coil, which end includes the receiver 22, and the other end 69 of the secondary is joined by branch wire 70 to the contact-arm 10 and is also connected to the wire 71, leading to the other instruments and constituting a common return for all the instruments.

The operation of the system may be briefly described as follows: Let it be supposed that a person at No. 1 instrument desires to talk with a person at No. 2 instrument. In this case the push-rod 2 of No. 1 instrument is operated, which action, as above described, turns the wheel or disk $d$ and removes the contact-arm 10 from engagement with the terminal 13 and engages it with the terminal 12, thus completing the circuit of the call-bell of No. 2 instrument. This calling-circuit may be traced as follows, viz: from the positive pole of battery 64 by wires 65 50 to the metal frame $f$ of No. 1 instrument, thence by wheel or disk $d$, which is in metallic connection with the said metal frame, to push-rod 2, thence by wires 55 54 to frame $f$ of instrument No. 2, thence through No. 2 instrument by lever 21, pin 20, contact-spring 19, wire 62, bell 61, wire 60, terminal 13, contact-arm 10, and wire 70 to the return-wire 71, and by said return-wire back to instrument No. 1, entering by wire 70 to contact-arm 10 and terminal 12, and thence by wire 63 to the negative pole of the battery. The operator at No. 1 instrument removes the pressure from the push-rod 2, which is forced out by its spring $i$ until arrested by the engagement of the disk or wheel $d$ with the upper surface of the cone 2, the disk or wheel being moved by its spring 15 a sufficient distance to remove the contact-arm 10 from the terminal 12 and engage it with the terminal 13. The talking-circuit between the instruments is now completed and may be traced as follows: Assuming that No. 1 is talking with No. 2, the circuit through the primary wire of the induction-coil is as follows: from the battery 64 by wires 65 50 to metal frame $f$, thence by lever 21, pin 20, contact-spring 17, and wires 68 67 to back disk of carbon-holder, through the carbon to the front disk and its spring 35 and wires 66 and 63 to the negative pole of the battery 64. The circuit through the secondary wire of the induction-coil is as follows: from the push-rod 2 of No. 1 instrument by wires 55 54 to metal frame $f$ of instrument No. 2, thence by lever 21, pin 20, spring contact-arm 18, and wire 168, through the receiver 22 and secondary wire of induction-coil, to wire 70, thence by return-wire 71 to instrument No. 1, through the secondary of the induction-coil of instrument No. 1, through the receiver 22 to spring 18, thence by pin 20, lever 21, and frame $f$ to ring or disk $d$ back to starting-point—namely, push-rod 2.

In the manner above described the operator at any instrument in the system may call up and talk with an operator at any other instrument.

Each push-rod $g$ may be released from the disk or wheel $d$ by the hooked lever 21 or by the operation of another push-rod.

I may prefer to employ a complete disk or wheel, as shown, as a large number of instruments may thereby be included in the system; but it is evident that a sector of a wheel may be used.

I claim—

1. In an instrument of the class described, the combination with a rotatable device having a contact-arm attached thereto, circuit-terminals coöperating with the opposite sides of said contact-arm, a series of circuit-controllers coöperating with said rotatable device and constructed to move said device in one direction to engage said contact-arm with one of said terminals, and to permit said device to move in the reverse direction to engage said contact-arm with the other of said terminals and yet leave the circuit-controller locked in engagement with the said device until positively released, substantially as described.

2. In an instrument of the class described, the combination with a rotatable disk or wheel, a circuit-controller operated by movement of said disk or wheel, a plurality of movable circuit-controllers coöperating with said disk or wheel and each constructed to move the said disk or wheel in one direction when pressure is applied to said circuit-controller, and to permit a partial movement of said rotatable disk or wheel in the reverse direction when the pressure is relieved from said circuit-controller and yet leave said circuit-controller locked in engagement with said wheel or disk, and means to move said disk or wheel to release said controller from its locked position, substantially as and for the purpose specified.

3. In an instrument of the class described, a rotatable device provided with a plurality of pins or projections, a contact-arm operated by movement of said device, and a plurality of push-rods coöperating with said device and constructed to pass by said pins or projections and move said rotatable device its full range of movement in one direction and to permit a partial return movement of said rotatable device and yet leave the push-rod locked in engagement with said rotatable device, and means to act on said rotatable device and release said locked push-rod, substantially as described.

4. In an instrument of the class described, a rotatable device provided with a plurality of pins or projections, a contact-arm operated by movement of said device, a plurality of push-rods coöperating with said device and adapted to pass by said pins and be locked by said pins after a partial return movement, a lever, a dog pivoted to said rotatable device, and a projection on said lever adapted to engage said dog to move said device and release the locked push-rod, substantially as described.

In testimony whereof I have signed my name to this specification in the presence of two subscribing witnesses.

F. A. SWAN.

Witnesses:
  Jas. H. Churchill,
  J. Murphy.